May 29, 1951  F. H. ETZENHOUSER  2,555,188
DUAL VALVE FOR FLUIDS
Filed Jan. 17, 1949
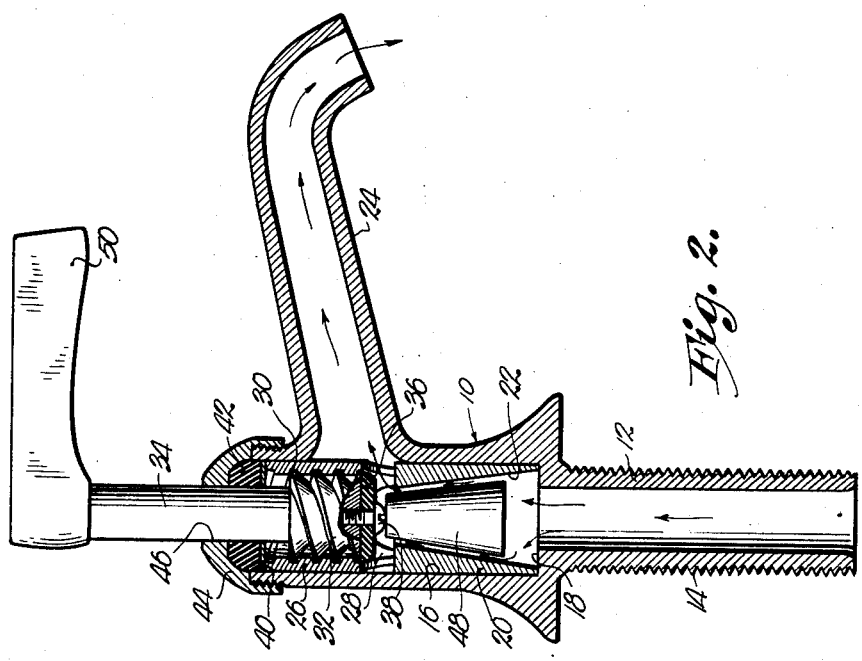
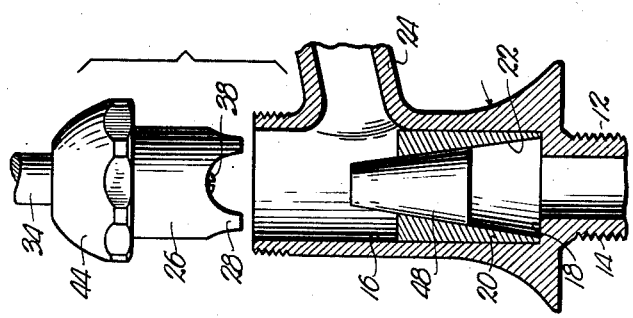
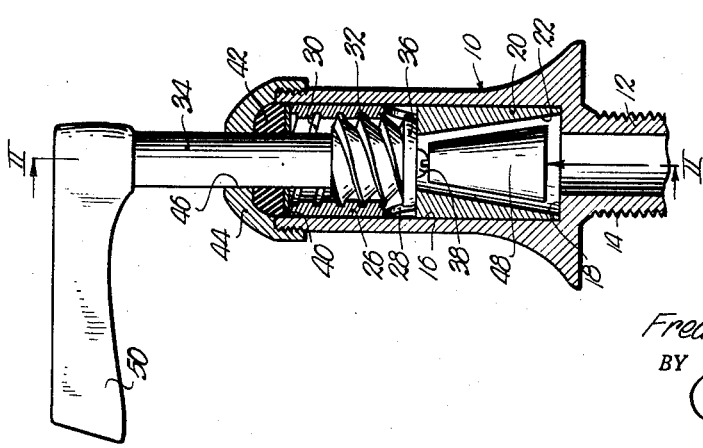
INVENTOR.
Frederick H. Etzenhouser
BY
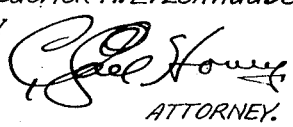
ATTORNEY.

Patented May 29, 1951

2,555,188

UNITED STATES PATENT OFFICE 2,555,188

DUAL VALVE FOR FLUIDS

Frederick H. Etzenhouser, Independence, Mo.

Application January 17, 1949, Serial No. 71,248

1 Claim. (Cl. 277—27)

This invention relates to manually operable valves or faucets for controlling the flow of pressurized fluid, and more particularly to a water spigot of the type commonly employed in plumbing in the home.

It is universally known that the usual type of water faucet equipped with a resilient gasket, requires repair from time to time with respect to replacement of such gasket or valve and that such conventional faucets are so formed as to require a shutting off of the water pressure before such replacement of the valve can be made. Oftentimes this necessitates the closing of a common valve to the entire water system of the home located in the basement and such valve oftentimes becomes rusted, and when closure thereof takes place, the valve breaks and an expensive plumbing bill results.

It is the primary object of the present invention therefore, to eliminate these problems and to provide a valve having a replaceable resilient gasket as a part thereof that is changed from time to time in the usual manner, and additionally provided with means for automatically preventing the flow of pressurized water through the valve while such replacement takes place.

Another important object of the present invention is the provision of a water faucet having a pair of opposed valves both of which are capable of movement manually to a position closing the faucet, said valves being disposed relatively to alternately close the faucet depending upon the positions thereof.

Another important object of this invention is the provision of a faucet having a pair of opposed valve seats and a valve for each seat respectively, one of the valves being floatably disposed within the faucet body for movement toward the closed position by the pressure of the water itself and toward the open position by a manually operable member, all to the end that the said member can be entirely removed from the faucet and the floating valve will automatically close the faucet while the gasket on such member is being replaced.

Other objects of more minor character will be made clear or become more apparent as the following specification progresses, reference being had to the drawing, wherein:

Fig. 1 is a substantially central vertical cross-sectional view through a dual valve for fluids, made in accordance with my present invention showing the same fully closed when all parts thereof are assembled.

Fig. 2 is a vertical central cross-sectional view taken on line II—II of Fig. 1 but showing the handle thereof offset 90 degrees from the position thereof in Fig. 1; and Fig. 3 is a fragmentary cross-sectional view similar to Fig. 2, but showing parts of the assembly removed and the position of the floating valve when the apparatus is in such condition.

An elongated body 10 is provided with a tubular extension 12 integral therewith and extending from the normally lowermost end of body 10. This extension 12 is externally threaded as at 14 for connection to a lavatory or the like and with conduits leading from a source of fluid supply (not shown) in the usual manner.

Body 10 has a longitudinal bore 16 formed therethrough that has a slightly larger diameter than the diameter of the opening through the extension 12. Bore 16 registers with, and is disposed substantially co-axially with, the extension 12.

A shoulder 18 is thereby presented adjacent the lowermost end of the body 10 and forming the bottom of bore 16. An elongated sleeve 20, having a cylindrical outermost surface, is fitted within the body 10 in resting relationship with respect to the shoulder 18 thereof. Any suitable means for holding the sleeve 20 rigidly within the body 10 such as by a press-fit, may be used.

Sleeve 20 is provided with a longitudinal, frusto-conical bore 22 therethrough that places the extension 12 into direct communication with the uppermost end of bore 16 above sleeve 20. The base of the bore 22 is adjacent the shoulder 18 and has a diameter only slightly less than the diameter of the bore 16, but appreciably greater than the opening through extension 12. The diameter of the uppermost end of the frusto-conical bore 22 is substantially the same as the diameter of the opening through extension 12.

A laterally extending tubular spout 24 integral with the body 10 has its innermost end registering with the bore 16 through body 10 immediately above the uppermost end of the sleeve 20. A relatively short tube 26 is freely slidable into the uppermost open end of the body 10, said tube 26 being provided with a plurality of spaced apart ears 28 at its lowermost end, said ears 28 resting directly upon the uppermost end of the sleeve 20 when the component parts of the faucet are assembled.

The tube 26 is provided with internal threads 30 for receiving an enlarged externally threaded portion 32 of an elongated rod 34. A circular gasket of resilient material 36, is removably mounted upon the innermost end of the rod 34 through the medium of a screw 38. Screw 38 passes through an opening provided within the gasket or washer 36 and is threaded into a tapped, centrally disposed cavity extending inwardly from the innermost end of the rod 34. The diameter of the gasket 36 is greater than the diameter of the bore 22 at the uppermost end thereof and is substantially the same as the diameter of the tube 26.

A washer 40 and a resilient packing member 42 circumscribe the rod 34 intermediate the ends thereof, washer 40 resting directly upon the uppermost end of tube 26 within body 10 and the packing member 42 being superimposed upon the washer 40 within body 10.

A cap 44 having a central opening 46 for clearing the shaft 34 is slidably mounted upon the uppermost end of body 10 and when in place, as illustrated in Figs. 1 and 2, cap 44 compresses slightly the member 42 and holds the tube 26 against the uppermost end of the sleeve 20. A frusto-conical valve 48 is floatingly mounted within the body 10 and particularly within the bore 22 of sleeve 20. This valve 48 is complementary to the bore 22, but appreciably smaller and has its base disposed downwardly in the same manner as bore 22. The pressure of the water or other fluid moving into the faucet from extension 12 normally holds the floating valve 48 biased toward and against the head of screw 38 as illustrated in Figs. 1 and 2.

It is to be noted in Fig. 2 of the drawing, that the spaces between the ears 28 of tube 26 are in direct registering relationship with the bore 16 above sleeve 20 and with the tubular spout 24. Rotation of the rod 34 and consequently reciprocation thereof, longitudinally of the tube 26 toward and away from the extension 12, is manually accomplished through the medium of a laterally extending handle 50 on the uppermost end of the rod 34. It is seen that the uppermost end of the sleeve 20 constitutes a seat for the valve 36 and when the latter is in the position shown in Fig. 1 of the drawing, valve 48 is held at the lowermost end of its path of travel by the head of screw 38. When the component parts of the faucet are as illustrated in Fig. 1, flow of fluid through the faucet is prevented by the valve 36 resting directly upon the uppermost end of sleeve 20 and in closing relationship to the bore 22. When the rod 34 is turned to the position illustrated in Fig. 2 of the drawing, the valve 36 is raised from the seated position on the sleeve 20 and liquid is free to flow through the bore 22 into the tube 26 through the openings between ears 28 and thence outwardly through spout 24 as indicated by arrows in Fig. 2 of the drawing. Continued rotation of the shaft 34 to move the same upwardly, will permit upward movement of the floating valve 48 still further from that shown in Fig. 2, to the position shown in Fig. 3. When valve 48 is held in a seated position by the pressure of the fluid entering the faucet as shown in Fig. 3, the cap 44 can be removed to permit complete removal of the rod 34 without danger of flow of the fluid beyond the sleeve 20. As shown in Fig. 3 of the drawing, when the cap 44 is released from body 10, not only rod 34 and valve 36, but the entire tubular member 26, can be removed from the body 10. Replacement of the valve 36 is then a simple matter and flow of fluid will be stopped until the rod 34 is replaced to a point where the screw 38 again bears against the uppermost end of the valve 48 and forces the same downwardly to an unseated position. It is to be noted that sufficient clearance is provided to permit full closing of the valve 48 by rotation of rod 34 in one direction prior to removal of the cap 44, thereby assuring that the flow of fluid has been stopped prior to disassembly.

Manifestly, such changes and modifications as fairly come within the scope of the invention as defined by the appended claim, are contemplated hereby.

Having thus described the invention, what is claimed as new and desired to be secured by Letters Patent is:

A faucet for water supply pipes comprising a hollow body having an elongated bore therethrough and an annular shoulder in the bore facing one end thereof, the opposite end of the bore being open; an outlet spout registering with the bore between said shoulder and said one end thereof; an insert complemental with said bore and tightly fitted therein between said spout and said shoulder and bearing at one end thereof against said shoulder, said insert having a tapered opening therethrough coaxial with the bore; a frusto-conical valve floatingly mounted in said opening with its end of greatest diameter adjacent said one end of the insert, said valve being complemental with said opening movable toward and from a position against the shoulder; a sleeve in the bore and bearing against the opposite end of the insert, said sleeve being coaxial with the insert and having perforations therein registering with said spout; manually operable structure shiftably mounted in said sleeve and engageable at the inner end thereof with said valve for moving the same toward said shoulder when said structure is shifted in one direction; and a second valve adjacent said inner end of the structure for closing the proximal end of said tapered opening of the insert when the structure is shifted in said one direction, said end of the frusto-conical valve engaging the said shoulder to close the bore when pressure in the water supply pipe with which the faucet is used drops below an amount sufficient to hold the valve away from the shoulder.

FREDERICK H. ETZENHOUSER.

REFERENCES CITED

The following references are of record in the file of this patent:

UNITED STATES PATENTS

| Number | Name | Date |
|---|---|---|
| 584,897 | Ryan | June 22, 1897 |
| 1,190,530 | Engel | July 11, 1916 |
| 1,605,262 | Midgley | Nov. 2, 1926 |
| 1,708,241 | Schultheiss | Apr. 9, 1929 |

FOREIGN PATENTS

| Number | Country | Date |
|---|---|---|
| 4,502 | Great Britain | June 22, 1897 |
| 132,399 | Switzerland | of 1929 |